Aug. 28, 1962      J. C. GORDON      3,051,608
RESILIENT ARTICLE AND METHOD OF MANUFACTURE THEREOF
Filed April 18, 1958      3 Sheets-Sheet 1

INVENTOR.
Jack C. Gordon.
BY
Harness, Dickey & Pierce
ATTORNEYS

Aug. 28, 1962   J. C. GORDON   3,051,608
RESILIENT ARTICLE AND METHOD OF MANUFACTURE THEREOF
Filed April 18, 1958   3 Sheets-Sheet 2

INVENTOR.
Jack C. Gordon
BY
ATTORNEYS

Aug. 28, 1962      J. C. GORDON      3,051,608
RESILIENT ARTICLE AND METHOD OF MANUFACTURE THEREOF
Filed April 18, 1958      3 Sheets-Sheet 3
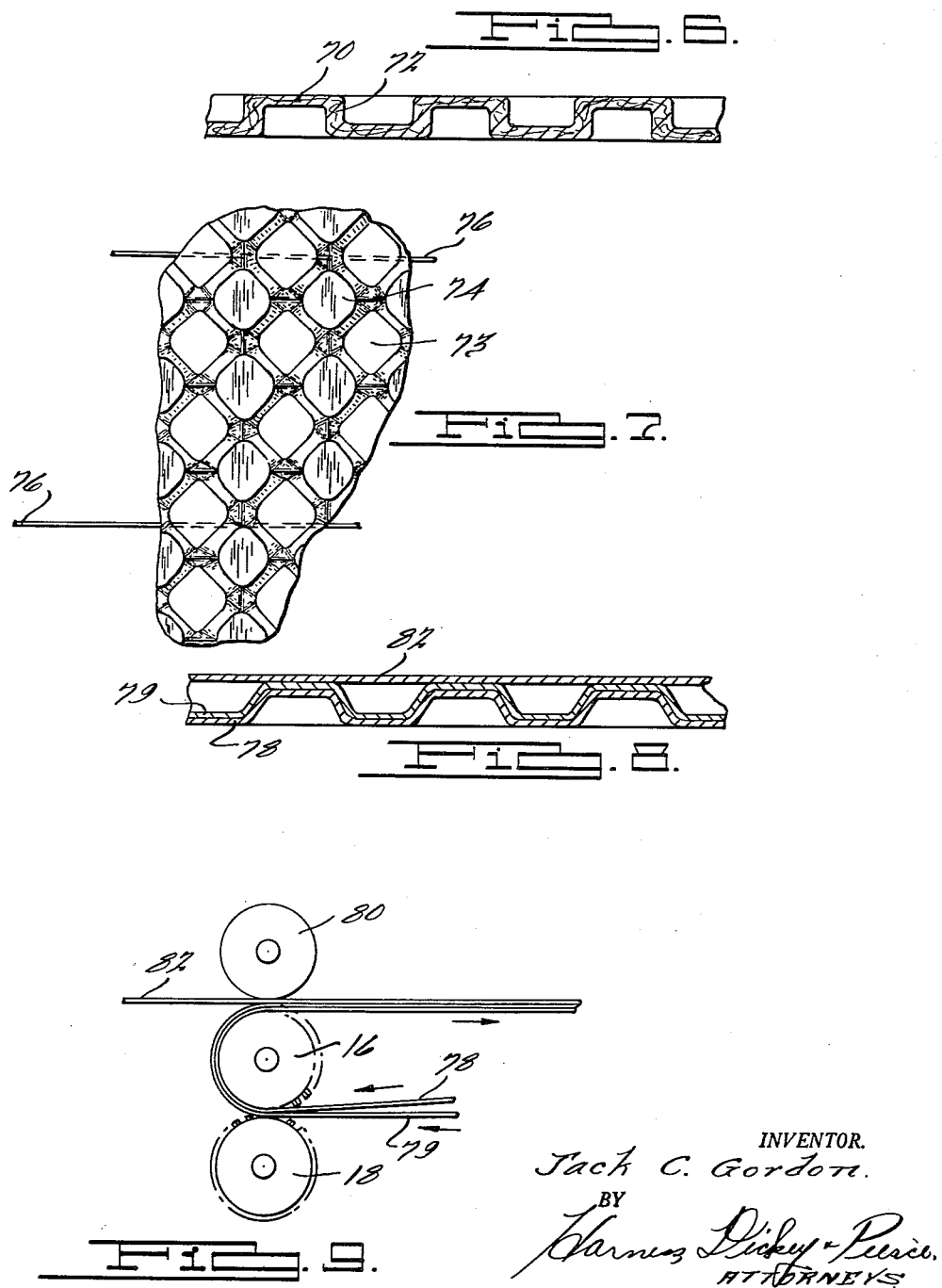
INVENTOR.
Jack C. Gordon.

3,051,608
RESILIENT ARTICLE AND METHOD OF MANUFACTURE THEREOF

Jack C. Gordon, % Gordon Chapman Co., 1720 12th St., Detroit, Mich.
Filed Apr. 18, 1958, Ser. No. 729,331
7 Claims. (Cl. 156—339)

This invention relates to pads for use as packing material, as wall coverings, as insulation, as acoustic damping material, and the like, and to methods for manufacturing such pads as well as pads for use as rug underlays and the like.

This application is a continuation-in-part of my applications Serial Nos. 369,458, filed July 21, 1953, and 440,581, filed July 1, 1954, both now abandoned, and is a continuation-in-part of application Serial No. 545,848, filed November 9, 1955, issued as Patent 2,856,323, dated October 14, 1958.

Fibrous materials and the like have commonly been employed in sheet form for various padding purposes, such as those enumerated above. In substantially all such uses, the padding capability accrues either from the natural resilience, the looseness, or the inherent air-trapping characteristics of these selected materials. The characteristics which recommend various materials to such uses, however, also normally tend to render those materials difficult or unwieldy of application. Thus, matted fiber pads used as rug underlays tend to have exceedingly poor dimensional stability and loose fiber packing or insulating materials and wall coverings are difficult of either initial installation or retention in position.

In one solution, bats are formed of loose fibrous material such as excelsior or insulating material backed by or sandwiched between sheets of paper. In other cases, the fibrous material per se is so compressed and bonded as to become relatively rigid and self-supporting, in the nature of certain wallboards and molded egg separators.

In other padding, such as rug underlays, increased strength and dimensional stability have been imparted to matted fibrous sheets by compressing portions of the sheet in a pattern, ofttimes resiliently bonding the material in its selectively compressed form, as is disclosed, for example, in my Patents 2,541,868 and 2,572,470.

In accordance with the teachings of the present invention, materials are formed into pads suited for any of the aforesaid purposes as well as for others. Contrary to the prior practices, rigidity, strength, resistance to crushing and dimensional stability are achieved not so much from the innate characteristics of the material itself as from the structural shape into which it is formed. In the preferred forms, a plurality of small, load-bearing areas are trussed between supporting walls, with the walls acting, in essence, as columnar members and with the volume defined by the trussed area and the supporting walls therefor serving as an air cavity. The cellularly trapped air serves as an insulator and/or as a resilient, compressible reinforcement to the trussed area to correspondingly increase the load-bearing capabilities of the pad. The intercell walls may be substantially impervious to air, but advantageously are adapted to allow a transfer of air from cell-to-cell at a controlled, slow rate. This may be accomplished either by rendering the cell walls semipervious to air or by interconnecting relatively impervious cell walls with minute air-transmitting channels.

In the disclosed forms, a sheet of material is distorted to define a plurality of cups and raised portions on each surface of the sheet, the bottom of each cup on one surface constituting the top or plateau of a raised portion on the other surface. Whether the original sheet be relatively thick or thin, the thickness of the bottom wall of each cup on each surface is preferably less than one-half of the thickness of the finished article and is preferably substantially impervious to air flow therethrough.

Where the original sheet is relatively thick, such as a matted-fiber rug underlay material, there is or may be compression of the fibers in the bottom walls of the cups, but the forming of the sheet material, under the principles of the present invention, is by a drawing operation, assimilable to deep drawing in metalworking. The operation is not properly characterizable as molding since the sheet material is and remains solid throughout the forming. As far as is known, it is not possible to form articles of fibrous material of this nature into the herein defined configurations without performing, in effect, a deep drawing operation, and, as far as is known, drawing of fibrous materials of this nature has not previously been attempted.

Materials to be formed by the machine and methods set forth herein must have, or have imparted thereto, adequate ductility to permit the requisite depth of draw. Matted fiber pads and certain other materials such as burlap tend to have sufficiently loose interparticle binding to permit proper drawing without pretreatment. Other materials, including most papers, may require treatment preliminary to or concurrently with the drawing, effectively to increase their ductilities so as to prevent rupture.

Sheets deformed to the noted configuration may be resiliently fixed by the application of an appropriate bonding agent thereto.

For special purposes, the pads so formed may be provided with planar backing sheets on one or both faces, may be provided with any desired coating to better adapt the article to its ultimate use, may be provided with inlays of wire to facilitate the attaching of the pads to an object to be protected, and may be otherwise modified within the scope of the invention.

An object of the invention is to reduce the cost and to increase the effectiveness of pads employed for rug underlays, packing, insulation, sound damping, and the like.

Another object of this invention is to improve the methods of manufacturing pads and to permit the drawing of low-ductility materials.

The manner of accomplishing the aforesaid and other objects of the invention will be appreciated from the following detailed description of embodiments of the invention when read with reference to the accompanying drawings in which:

FIG. 6 is a vertical sectional view taken substantially along the line 6—6 of FIG. 5;

FIG. 7 is a perspective view of a different article which may be manufactured by the system of FIG. 1 and which may be deformed by the machine of FIG. 2;

FIG. 8 is a view of a modified form of article embodying certain of the principles of the invention; and FIG. 9 is a view of a mechanism for forming the article of FIG. 7.

The principles of the present invention are primarily although not exclusively applicable to articles, and the manufacturing thereof, formed from sheets of solid, fibrous materials including felted jute or other matted fiber sheets (e.g., flax, sisal, animal hair, or combinations thereof), paper, cloth including burlap, and so forth. The shape of the flat sheets is distorted into a selected pattern by an operation most accurately characterized as drawing, for reasons set forth hereinafter. To resiliently retain the article in its deformed shape, a bonding or binding material is applied to the sheet or sheets, becoming a solid coating on or partial impregnation of the surface or surfaces of the article upon the completion of an appropriate drying or curing operation.

Figure 1:
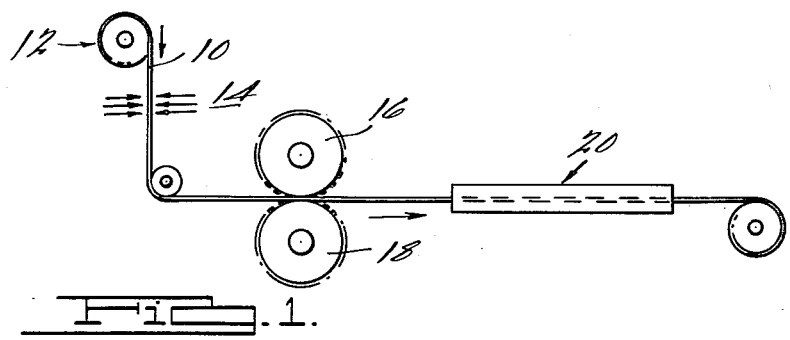
FIGURE 1 is a diagrammatic representation of a system for processing articles under the principles of the invention.

Certain equipment for forming the articles disclosed herein, and others, is diagrammatically represented in FIG. 1 of the drawings. The stock sheet material 10 is withdrawn from any suitable source such as a supply roll 12. At some time prior to, during or after deformation, an appropriate bonding or binding material is applied to one or both surfaces of the material. It is convenient to apply this material, by spraying, roll coating or otherwise, prior to the deforming operation since at that time the sheet has a relatively smooth surface and even application of the coating is more readily achieved. Further, as will be noted hereinafter, the application of the bonding material prior to deformation also permits, in some cases, a partial or even a full cure of the bonding material during the deforming operation, permits a liquefying of solid bonding materials during deformation, and permits the bonding material or its liquid carrier to serve to wet the surface or surfaces of the sheet prior to or during deformation. Additionally, the application of the bonding material prior to deformation permits the density of the bonding material on the finished article to be varied if desired. In the arrangement of FIG. 1, the sheet material 10 is passed by a bank of sprayers 14 adapted to apply a liquid bonding material or a mixture of a liquid and a solid bonding agent to one or both surfaces of the sheet.

The bonding material should have the capability of adhering to the surface of the article after deformation, be flexible in nature at least after curing or drying, and possess the capability of resiliently fixing the article in its deformed shape. It may be a coating or size either solid or liquid in initial form. The bonding material may be, for example, a thermoplastic material normally supplied in liquid form or may be a normally solid bonding agent dissolved, suspended or dispersed in a liquid. The exact nature of the bonding material which is employed will be determined by a number of factors including availability, cost, the nature of the sheet material 10, and the characteristics desired in the completed article. Any of a vast variety of sizes can be used including starches, gums, resins, cements, varnishes, and latexes or rubber dispersions, carried in water or some other appropriate liquid. As one example of a bonding material employed in practice in conjunction with a matted fiber web to form a rug underlay, a composition may be employed comprising a dispersion in water of a mixture of approximately one hundred parts of neoprene, one part of phenyl alpha naphthyl amine, one part of para phenol, ten parts of carbon black, and five parts of zinc oxide suspended as a 50% latex in water. Obviously, the amount of such solution which is applied will be determined on the basis of considerations such as those previously enunciated, including the degree of pliancy or rigidity of the completed article. For rug underlays, in which the matted jute fiber formation has a thickness in the order, for example, of one-eighth to one-quarter of an inch, it has been found satisfactory to apply one or two ounces (dry weight) of the mixture per square yard on each surface of the sheet material. If the rug underlay is formed with substantially less bonding material, such as less than one-half ounce of dry bonding material on each side of each square yard of the finished article, the article tends to be sleazy and to have inadequate resiliency and inadequate resistance to crushing and matting. On the other hand, if the quantity of bonding material on each face of the dried, finished article is increased to about four ounces per square yard or more, a continuous coating tends to result and a number of the advantages of the preferred arrangement are defeated.

The coated sheet 10 is then passed through a pair of deforming rolls 16 and 18 adapted to deform the material as it passes through the tangential nip thereof. Appropriate surface configurations of the rolls 16—18 will be described hereinafter. Rolls 16—18 exert substantial pressures on the material to draw the material to the final pattern and may and preferably do also serve to fully or partially set or cure the bonding material if means are provided for heating the rolls such as by flowing steam therethrough or by positioning a source or sources of radiant energy, such as heat lamps, adjacent the rolls. Such partial or full setting is normally employed, with a liquid bonding material, only if the sheet stock per se is incapable of transiently retaining the deformation created therein. Matted fiber tends rapidly to lose its deformed shape so that it is advantageous in that case to heat rolls 16—18 so as sufficiently to cure the representatively applied latex to retain the pattern imparted to the web. It will be noted that the heating may but need not be sufficient, either timewise or temperaturewise, to thoroughly dry the fabric and fully cure the rubber. In one practical embodiment of the invention, rolls 16—18 are heated to a temperature of about 270–350° F. If the temperature is reduced below the boiling point of the liquid in the bonding agent, it becomes difficult to obtain adequate partial curing with reasonable processing rates. Conversely, the temperature should be kept below that at which the raw material or the bonding agent tends to break down or ignite.

After deformation, with or without partial curing or drying, the deformed web is passed into a chamber 20 in which, for example, air at a temperature of 200° F. or more is circulated about the deformed web for an appropriate time, fifteen minutes being employed as a drying or curing period in one successful use of the method. This accomplishes a solidifying or drying or curing of the bonding material.

As will be better appreciated after consideration of the ensuing materials, the use of rolls 16 and 18 is purely representative and other means may be employed to produce the desired deformation of the sheet material.

Figure 2:
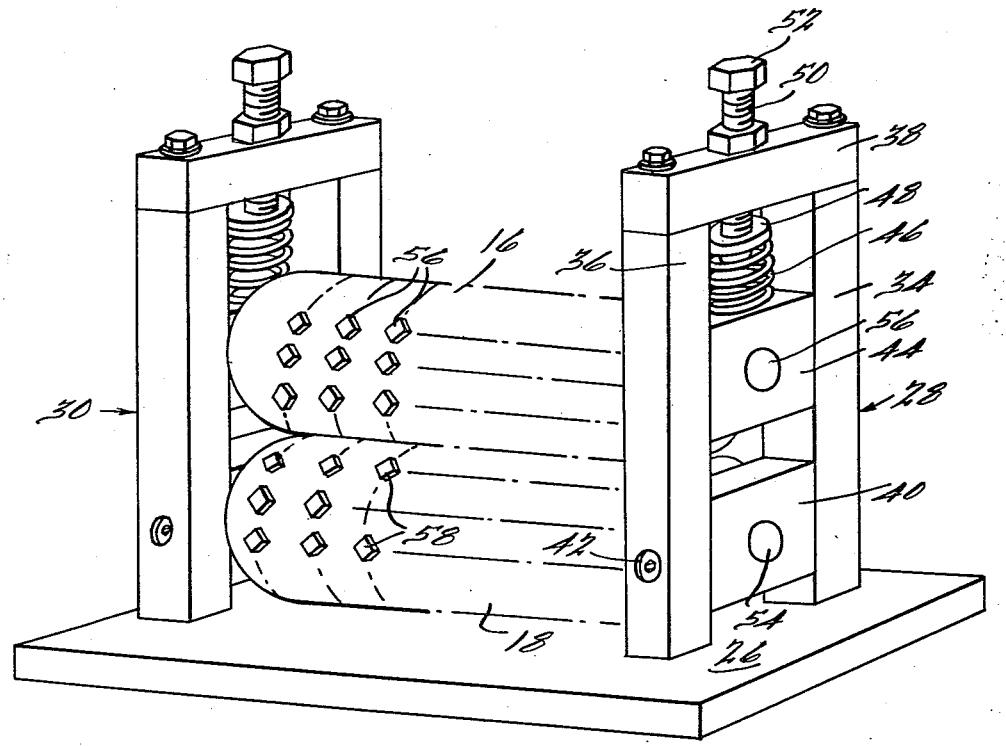
FIG. 2 is a perspective view of a machine useful in the practice of certain of the principles of the invention.

The machine represented in FIG. 2 of the drawings (which may but need not be employed in the system of FIG. 1) comprises a base 26 upon which a pair of pedestal assemblies 28 and 30 are mounted. Each of the pedestal assemblies, such as pedestal assembly 28, comprises a pair of uprights 34 and 36 mounted upon base 26 and interjoined at their upper ends by a top plate 38. A lower bearing block 40 is secured between the uprights 34 and 36 and is preferably fixed in position such as by a pin 42. An upper bearing block 44 is slidably mounted between the uprights 34 and 36 and is adapted to be biased downwardly to an adjustable extent by means of a coil compression spring 46, one end of which abuts the upper surface of the bearing block 44 and the upper end of which is seated in a bearing cup 48. Cup 48 is mounted upon a screw 50 which threadedly engages a tapped aperture in the top plate 38 and which terminates in a turning means such as head 52. It will be perceived that by rotating head 52 to advance screw 50 downwardly, the force exerted through cup 48 and spring 46 upon bearing block 44 may be increased, and conversely.

Bearing block 40 (and its counterpart in pedestal assembly 30) is adapted rotatably to support a shaft 54 which is keyed, welded or otherwise secured to the preferably tubular lower roll 18, while the upper bearing block 44 (and its counterpart in pedestal assembly 30) is adapted to support a shaft 56 secured to the upper roll 16, which is also preferably tubular.

It is important that adequate pressure exist between the rolls 16 and 18 during the forming operation, the extent of this pressure being established by the characteristics of the material being processed. For example, in processing rug underlay from raw material one-quarter inch thick, pressures in the order of fifty to one hundred fifty pounds per square inch are preferably employed to insure accurate and definite formation of the indentations. In manufacturing paper the pressures will normally be much less. In either case, the pressures must not exceed that value which produces rupturing of the raw material. If the upper roll 16 is heavier than is necessary to provide the maximum requisite pressure, then springs 46 should be adapted to press or pull upwardly on the upper bearing blocks 44. However, in a practical embodiment of the invention, it was found that greater force was required than was provided by the weight of the upper roll 16 alone and, consequently, springs 46 were disposed and employed as described. If desired, a limit stop (not shown) may be provided to establish the lowermost position of bearing blocks 44 and, hence, the minimum spacing between the rolls 16 and 18.

Figure 3:
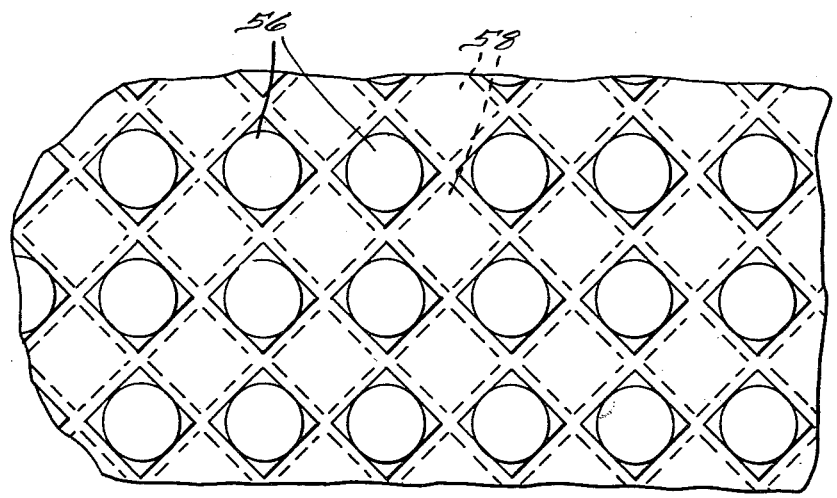
FIG. 3 is a fragmentary developmental view of the rolls of FIG. 2 showing the relationship of the protuberances thereupon.

The rolls 16 and 18 are provided with a plurality of protuberances 56 and 58, respectively. An exemplary nature and positioning of these protuberances 56 and 58 is represented in the developmental view of FIG. 3 of the drawings which is intended to represent a portion of the surface of the roll 16 developed to a plane, with the protuberances 56 thereon, and with the protuberances 58 being shown in dotted lines in the position they would assume if roll 18 were similarly developed to a plane. In that representative showing of FIG. 3, a regular pattern of protuberances is established, each protuberance exemplarily being square in any cross-sectional plane taken parallel to the surface of the roll. In the pattern shown, the protuberances on each of the roll surfaces lie in regular circumferential, longitudinal and helical rows. The diagonals of the squares are representatively aligned circumferentially rather than helically, in the disclosed arrangement, which tends to provide a better stress distribution during the drawing of the material. The protuberances in each helical roll of protuberances are spaced sufficiently far apart to permit the interposition therebetween of a protuberance 58 on the surface of the mating roll, with a selected space existing between each protuberance on one roll and any protuberance on the other roll. It will be observed that each protuberance on each roll surface is effectively bounded by four protuberances on the mating surface, the faces of the protuberances being adjacent, each group of four protuberances defining a cavity adapted to accept a protuberance on the other roll.

As a concrete example of an arrangement which has been successfully employed in practice, the protuberances 56 may be mounted on approximately one-inch centers both longitudinally and circumferentially of the roll, with the protuberances 58 being similarly mounted on approximately one-inch centers both longitudinally and circumferentially of the other roll, but with the grid work of center lines on the two rolls being both circumferentially and longitudinally medially offset. The protuberances themselves may conveniently be bolt heads, standard square ⅜ inch bolts being employed in one practical embodiment of the invention, so that each of the protuberances is about ⅝ inch on a side and extends above the surface of the roll with which it is associated about $9/32$ inch.

The bolts may be secured to the roll in any suitable fashion, such as by reaming a plurality of appropriately sized body holes in the face of the roll, inserting the bolts therein, and securing them in position by welding, by staking, or by screwing nuts thereon. If the roll is solid, other methods of attachment of the bolts may be necessary, such as by establishing a drive fit between the shank of the bolt and the hole into which it is to be inserted. After the bolts are inserted into position, their heights may be uniformed by turning or grinding the roll.

The rolls may also be constructed by milling appropriate slots in the surface of a solid roll, a tubular member or a sleeve.

Figure 4:
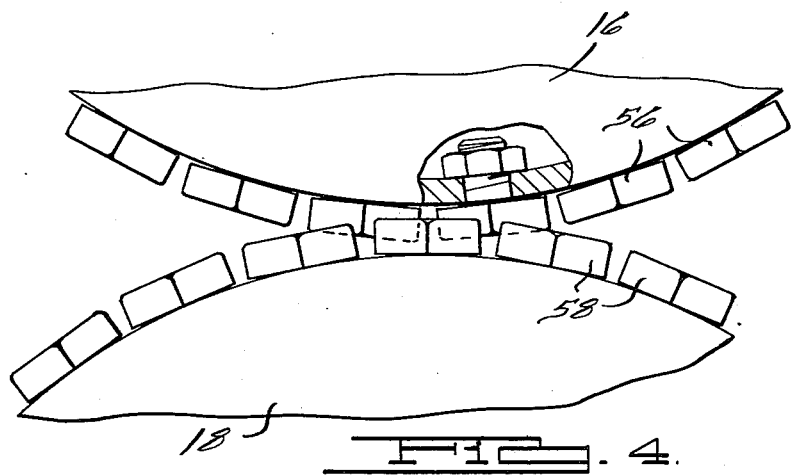
FIG. 4 is a fragmentary side view of portions of the mating surfaces of the rolls of FIG. 2.

As may best be seen in the fragmentary end view of FIG. 4, not only are the protuberances 56 and 58 spaced apart laterally, but also the spacing between the rolls is selected so that the protuberances on one roll do not strike the surface of the mating roll. In a representative arrangement for forming rug underlays from material approximately ¼ inch thick, the protuberances 56 and 58 are each about $9/32$ inch high, with a spacing of about $1/16$ inch being established between the end face of each protuberance and the surface of the mating roll. Obviously, other spacing may be desirable or required for thicker or thinner materials. Substantially closer spacing may be in order where paper is employed as the raw stock material.

It will be appreciated that the shape of the individual protuberances may be modified within the principles of the invention. Thus, the protuberances 56 may each be rotated forty-five degrees (FIG. 3) so that the side faces of the protuberances on any one roll are adjacent one another, the protuberances may be other than square, including rectangular, hexagonal, round and substantially any other regular or irregular form; the face surfaces of the protuberances may be flat, portions of circular cylindrical surfaces, spherical or spheroidal surfaces, ellipsoidal surfaces, and so forth. Similarly, the sides of the protuberances may taper in the nature, for example, of frusto-conical or frusto-pyramidal elements. All protuberances ned not be the same size or shape nor need there be a regular pattern of protuberances so long as the relationship between the protuberances on one surface and the protuberances on the other is maintained so that there is an appropriate semi- or spaced-meshing of the mating protuberances.

In the shown arrangement, both rolls are circular cylindrical, with means being provided to drive the two rolls at the same surface speeds. In practice, one or both of the rolls may be otherwise conformed such as being semi-circular cylindrical. Both rolls need not be cylindrical. Thus, for example, a flat plate may be employed in lieu of one of the rolls, with the remaining roll rotating with respect thereto and with means being provided for moving the rotational axis of the cylindrical or partially cylindrical roll in translation longitudinally of the flat plate, or vice versa, in the nature of a rack and pinion. However, while the articles can be formed by pressing a single protuberance between a flat plate nest of protuberances, it has been found that fibrous materials of the noted nature normally do not have sufficient ductility to permit their deformation between extended-area flat plate dies, at least deformation to the desirable depth, without rupturing. Apparently, the material in such an arrangement is too restricted against longitudinal and transverse fiber flow. Of course, at a lower production rate, a single row of protuberances can be mounted upon a curvilinear member which is rocked upon a flat mating die and transversely of the direction of incremental movement of the material.

It will be perceived that a pattern corresponding to that upon the rolls 16 and 18 will be imparted to a sheet material passed between those rolls. As an example, if a matted fiber sheet of ⅛ inch to ¼ inch in thickness be passed between the rolls of FIGS. 2–4, the sheet will be deformed to the shape represented in FIGS. 5 and 6 of the drawings, which show a rug underlay resiliently retained in deformed condition by a bonding step in the practice of the method represented in FIG. 1, for example. Each surface of the article comprises a plurality of protuberances and cups or depressions such as protuberances 66a and cups 68a on the upper surface of the article and protuberances 66b and cups 68b on the lower surface of the article. The bottom wall of each cup 68 on one surface constitutes the face wall or plateau of a protuberance 66 on the other surface. The plateaus or face walls of the protuberances on each of the surfaces may be considered to be diaphragms trussed between bounding substantially vertical walls, those plateaus serving as load-bearing surfaces supported, at least in part, by the columnar action of the gridwork of walls.

The strength and at least the transient load-bearing capabilities of the pad may be enhanced by imbuing the article with semi-pneumatic characteristics. If the raw stock material is relatively impervious to air flow, this semi-pneumatic characteristic is automatically achieved. However, if a material which is by its nature relatively porous, such as matted fiber, is employed as the raw stock material, the degree of interroll pressure and the nature and extent of the bonding material are preferably selected in the light of the thickness and nature of the raw stock material to reduce the perviousness of at least a portion of the article to the transmission of air. Thus, in the article shown in FIGS. 5 and 6 of the drawings, the spacing between the top face of each protuberance on each roll and the surface of the other roll is selected to provide a partial compacting of the fibers defining the plateaus or diaphragms on each surface of the finished article. If desired, there may be a partial surface impregnation of those fibers with the bonding material. It may also be desirable to space the protuberances on each of the two rolls so that the wall thickness is sufficiently less than the thickness of the raw stock material to produce a compacting of the vertical wall structure of the finished article. In that event, each cup forms, in cooperation with the underlying floor or the overlying rug, an air cell from which air cannot readily escape. However, it has been found to be preferable to leave the side walls semi-pervious to the transmission of air so that when a load is applied to a portion of the total area, the air in the cells in that area may be slowly exhausted to other cells and so that when the load is relieved, air from other cells may travel back through the cell walls to refill the previously partially exhausted cells and restore them to volume. In this preferred arrangement, therefore, the total load is borne partly by the trussed diaphragms supported by the columnar action of the walls and partly by the semi-pneumatic effect accruing from the relatively complete imperviousness (under normal conditions of use) of the diaphragms to air flow and the but partial perviousness of the walls to air flow. In practical embodiments of the invention, the existence of a semi-pneumatic effect may be experienced by pressing downwardly upon the upper surface of the pad first with the pad supported on an air-pervious surface such as a screen or a perforated metal grillwork and then with the pad supported upon a solid surface such as a floor. The resilient resistance to crushing under the latter case is much greater than it is in the former. In either case, it will be found that the material will restore to its normal shape upon release of the forces due to the resilient fixing of that shape by the presence of the bonding material as a surface coating or as a partial surface impregnation.

Figure 5:
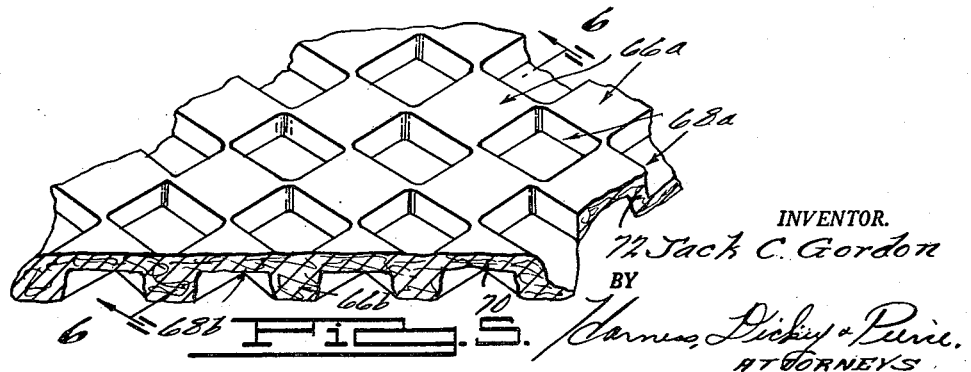
FIG. 5 is a fragmentary perspective view of an article which may be formed by the apparatus represented in FIG. 1 and which may be deformed by the machine represented in FIG. 2.

In the article of FIGS. 5 and 6, the thickness of the diaphragms 70 is shown to be substantially less than the thickness of the walls 72, with the cell walls 72 being more pervious to air flow than the diaphragms 70. It is also important to observe that the depth of each cup and the height of each protuberance is greater than one-half of the height of the total, finished article. If this were not true, then there would be no counterparts of the vertical walls and the salutary advantages of the formation shown would not accrue. Each wall 72 should divide and partially define cups or cells on opposite sides of the material.

The formation of the article of FIGS. 5 and 6, and of the other articles herein disclosed, is most accurately characterized as a drawing operation, akin to the deep drawing of ductile metals. It is not a molding operation since the raw materials are solid and remain solid throughout their deformation, and it is not simply a compressing or selective compressing operation such as those previously practiced in the art, exemplarily represented by the disclosures of my two above-noted patents. Deforming pressures are exerted sufficient to exceed the elastic limit of the stock sheet material and effect permanent changes in its contour, that is, to impart the counterpart of a permanent set to the material. In such formation, the pressures must not exceed the ultimate strength or breaking point of the material or there will be rupturing. Hence, the material must be, at the instant of deformation, adequately ductile so that it may be deformed to the desired degree without rupture, that is, the material must have at the instant of deformation a sufficient capacity for plastic (non-elastic) deformation in tension so that it will not rupture or fail.

In general, matted fibers of the type commonly used for rug underlays are adequately plastic (in the mechanical sense) to permit the desired degree of deformation without rupture even without pretreatment, contrary to the experience with certain other stock materials as will be noted, although, in any case, appropriate pretreatment may facilitate the drawing of the material.

One effect of the drawing operation will be perceived by viewing the cut edge of the article represented in FIGS. 5 and 6 of the drawings, in which it will be observed that the length of the undulating centerline of the material is substantially greater than the width, length or diagonal (depending upon the orientation of the article and the position of the protuberances on the rolls) of the final article. In running the raw stock through the machine of FIGS. 2 to 5, for example, a necking in of the stock will be observed just prior to the tangential nip of the rolls and it will be found that the total length of finished product will be somewhat less than the length of stock fed into the machine, although in both cases, the effect is less, down to zero, if the basic ductility of the material is sufficiently great. In the manufacture of rug underlay from ¼ inch thick stock, lateral take-up of about 3% and longitudinal take-up of about 5% was observed.

When the disclosed machine is employed, the spacing between the rolls and the spacing between the protuberances may be selected to provide a depth of draw within the ductility capabilities of any given fibrous material. However, articles which are effectively deep drawn roughly to the extent shown tend to the substantially more satisfactory in use than articles which are drawn to a lesser extent. Hence, where the natural ductility of the material is not adequate to permit drawing to the desired degree, it may be advisable to enhance the ductility of that material in some appropriate fashion. For example, the ductility of drawability of paper of most forms is not adequate for deformation by the machine shown in FIGS. 2, 3 and 4 with the physical sizes disclosed, the paper tending merely to rupture at each point of engagement with a protuberance on the rolls. However, if the paper (or other fibrous material) be weted by water or other appropriate liquid or vapor, the ductility may be increased adequately to permit the degree of deformation desired. For example, a steam chest may be interposed in the process line of FIG. 1 intermediate the supply roll 12 and the deforming rolls 16 and 18 or a liquid may be sprayed, coated or otherwise applied upon the surface or surfaces of the stock material by a bank of sprayers or other means additional to the bank shown at 14. Alternatively and advantageously, the bonding material per se may be employed as a wetting agent. Thus, if a solid bonding agent is dissolved, suspended or dispersed in water or other liquid (to form that which is herein included in the term bonding material), that liquid may in itself serve to wet the surface adequately to increase the ductility of the raw stock material to the necessary extent, so that the bonding material performs both the function of imparting increased ductility to the raw stock material prior to or during deformation and also of resiliently fixing the article in its deformed shape after curing (which is intended to include both heating and drying).

In a presently preferred rug underlay construction, raw material about ¼ inch in thickness is indented and resiliently fixed in a shape in which the over-all thickness of the final article is about ⅜ inch, although it is feasible to convert the same flat material into a final article of greater thickness if desired. The bases are compressed to a substantial degree to increase their density, the ¼ inch thick material being reduced to about 1/16 to ⅛ inch in thickness at the bases in the preferred arrangement, that is, the base thickness is not more than about one-third of the final article thickness and desirably is but one-fourth or less than the final article thickness. The vertical wall portions are desirably somewhat thicker than the bases and may be in the order of ⅛ inch thick. As a result of the drawing operation, the density both of the fibrous material and of the bonding material at the vertical walls is less than at the bases.

The deep drawing of the pad results in a product of improved uniformity of thickness even though the flat raw material varies substantially in thickness or density. Additionally, a pad of the requisite thickness can be formed with a much smaller quantity of the constituent materials, effecting a corresponding cost reduction.

The article shown in FIG. 7 of the drawings is representative of one manufactured of paper. The article of FIG. 7 may be conveniently manufactured by coating one or both surfaces of a single sheet of paper with an appropriate adhesive material (including the bonding agents and bonding materials hereinbefore enumerated) or by sandwiching such a material between two or more sheets of paper, and passing the resultant sheet or sandwich between the rolls 16 and 18. It will be noted that the depth of the cups 73 (on the shown surface) and the height of each of the protuberances 74 is many times the thickness of the raw paper sheet stock. If a liquid bonding material is employed, the liquid therein may be also used to enhance the drawability or stretchability of a type of paper which would otherwise rupture when passed through the rolls 16 and 18. It will be appreciated, however, that some papers do not require such pretreatment, particularly those papers which are supplied in an appropriate pretreated form such as latex impregnated papers or papers which have been previously creped at least in a direction transverse to their length, that is, so that there is excess material across the width of the sheet.

It is also feasible, and frequently advantageous, to employ a bonding material which is applied prior to deformation in solid form, either as a powder, or preferably, in practice, in sheet form. Thus, the article of FIG. 7, for example, may be manufactured by sandwiching a sheet of an appropriate material such as sheet polyethylene or a rubber hydrochloride sheet such as Pliofilm between two sheets of paper and passing the resulting sandwich between the rolls 16 and 18. If polyethylene or a similar thermally flowable material is employed, heat should be applied in an appropriate fashion to cause that material to flow just prior to or during deformation. As before noted, this heat may be conveniently applied by flowing steam through the rolls 16 and 18 or applying an internal or external source of heat to those rolls. If the raw stock material is adequately ductile to permit deformation without other treatment, then the only function of thermally flowing the previously solid bonding material is to distribute that material and to cause it to adhere to the surfaces of the sheets of raw stock. However, just as liquid bonding material may be employed to serve not only to resiliently fix the distorted shape of the article but also to wet the surface to increase its ductility, so also may the transforming of the solid polyethylene, or other solid bonding material, into a liquid state serve to similarly effectively wet the mating surfaces of the two sheets of raw stock material so as to adequately increase their drawability to permit the requisite degree of deformation. In most cases, it is not necessary to fully fuse the sheet bonding material. After deformation, curing or retransformation to the solid state must be accomplished by means such as heating unit 20 (FIG. 1).

Since the paper is substantially thinner than the representative spacing between the semi-meshing protuberances, the walls tend to be sloping and small channels tend to be formed interjoining the cells in a row. This enhances the distribution of air when a load is applied or released.

In manufacturing the paper article, it is preferred that the bonding material be present only as a light skin coat and to that end but a relatively small amount of bonding material is applied, such as one-eighth to one-half ounce, dry weight, per square yard of the material. Substantially greater quantities would tend to produce saturation of the paper which is not desired.

It will be appreciated that the article of FIG. 7 may be made of more than two layers of paper, so long as bonding or adhesive material of some sort exists between each of the adjacent sheets to secure them together.

The article of FIG. 7 is recommended by its resiliency, its cleanliness, its strength, and its lightness for shock wrapping, among other uses. It may, for example, be rolled into sleeves to serve as individual separators among a plurality of glass bottles in a carton or case. If the bottles or other articles being separated are light, then a single sheet of relatively light paper deformed as shown may be employed; for heavier bottles or other articles, multiple layers of thinner sheets, a thicker sheet, or multiple layers of thicker sheets may be employed. The article of FIG. 7 is also adapted for use as a shock wrap on larger items such as major automobile parts which are to be stored or shipped for replacement purposes. Thus, it may serve as an economical shock wrapping for automobile fenders, windshields, and so forth. If desired, a plurality of wires 76 may be rigidly retained within the article, extending on either side thereof to form a convenient means for attaching the wrapping to the article, such as by bringing the opposite ends of each wire together around the article and twisting them together. It will be observed that the wire will take or tend to take an undulating form due to the action of the deforming rolls so that the wire will be securely retained between the paper.

Paper or other fibrous material formed in the fashion hereinbefore described may also be employed as an insulating or wall covering material. For this and other uses, it may be advantageous to apply a flat sheet of paper or other material to one or both faces of the article of FIG. 7. Thus, there is represented in FIG. 8 of the drawings (distorted for clarity of representation) an article having a backing sheet applied to but one of the two face surfaces of the article. In that showing, two sheets of paper 78 and 79 are bonded together by sandwiching an appropriate bonding material therebetween and passing them through rolls 16 and 18, which are again represented in FIG. 9 of the drawings. Rather than drawing the deformed material from the rolls after they pass the tangential nip, as was done in the system of FIG. 1, the paper may be caused to follow the contour of one of the rolls, such as roll 16, and be withdrawn along a tangent to a point separated from the tangential nip, the paper representatively being drawn approximately 180° around roll 16 in the showing of FIG. 9. A smooth roll 80 is rotatably positioned in spaced proximity to the roll 16 and an additional sheet of paper 82 is fed between the rolls 16 and 80. An appropriate bonding material (desirably a quick-setting adhesive) is roll-coated or sprayed or applied in solid form between one surface of the sandwiched deformed sheets 78—79 and the smooth sheet 82 so that the sheet 82 will adhere to the deformed sheets 78—79 upon passing between the rolls 16 and 80. It will be appreciated that the spacing between rolls 16 and 80 should be selected so that there is good contact between the smooth and deformed sheets but so that there will be no effective crushing of the deformed sheets. Obviously, a second smooth sheet can readily be applied to the other surface of the deformed sheets 78—79, if desired, by employing another roll in cooperation with roll 80.

With a smooth sheet intimately adhered to one or both of the surfaces of the distorted sheets, the cells or groups of cells tend to be sealed to provide a series of air pockets serving as heat insulation. Somewhat improved insulating capabilities are attained by applying flat sheets to both surfaces of the distorted material, and an appropriate bonding material (such as sheet polyethylene) may be selected to provide a vapor barrier.

It is also contemplated that one or more of the inner or outer surfaces of the article of FIG. 8, or modified forms thereof, be coated with a reflective material to further enhance its insulating capabilities. Thus, one of the surfaces, advantageously an inner surface to protect the coating, may be sprayed or roll-coated with aluminum paint. It is further contemplated that the flat sheet be supplied in a width sufficiently greater than the width of the resultant distorted sheets to provide side flaps to permit the insulating pad to be conveniently tacked or stapled to the studs, joists or rafters of a building.

It will be appreciated that the type of raw stock sheet material which is employed, the thickness or number of layers thereof, and the type and quantity of bonding material which is applied thereto will be determined by the use to which the final article is to be placed. Thus, the rigidity of the final article may be increased by increasing the percentage of solid binding material. If a highly resilient structure is required, then, normally, reduced quantities of bonding material will be applied. If it is desired that the article be quite rigid, even to the extent that a sheet be free standing in the nature of wallboard, then the percentage of solid bonding material must be substantially increased. Similarly, the amount of liquid employed in a mixture of a bonding agent and a liquid or the amount of fusible solid bonding agent which is employed may be controlled by the amount of wetting which is required to impart the requisite ductility to the raw sheet stock. The test, particularly in the latter case, is functional. If in passing the coated stock material between the rolls 16 and 18, ruptures are discovered at any of the cups or protuberances on the finished surface, then it is an indication that the liquid must be increased, or that the percentage of moisture in the raw stock material must be increased in some other fashion, such as by passing the material through a steam chest. Similarly, if the finished article is insufficiently rigid or if its shape is not adequately permanized for the use to which the article is being placed, then additional bonding agent should be utilized.

It will be perceived that articles constructed in accordance with the principles of the present invention have great diversity of possible use. Thus, it is contemplated that sheets of stock having either a deformed or a smooth outer face (but a deformed inner construction) may serve as an excellent acoustic damping wall covering. The sound reflective characteristics of the material may be further reduced by employing softer material as the outer sheet. Thus, an article similar to that represented in FIG. 8 may be formed in which the outer smooth surface is constructed of paper of the softness of facial tissue, as presently available on the market. In practice, five-pound facial tissue has been applied to a distorted one-hundred-pound kraft paper by applying a small amount of polyethylene film between the two and fusing the polyethylene film only sufficiently to secure adherence without penetration. The soft superficial covering may also be distorted as an element of the forming operation in which case the outer surface of the board is provided with protuberances and cups rather than having a smooth surface.

While it will be apparent that the embodiments of the invention herein disclosed are well calculated to fulfill the objects of the invention, it will be appreciated that the invention is susceptible to modification, variation and change without departing from the proper scope or fair meaning of the subjoined claims.

What is claimed is:

1. The method of manufacturing a resilient pad which comprises the steps of applying an adherent bonding material to at least one surface of a sheet of flexible fibrous sheet material while maintaining a portion of the fibrous sheet material at the interior of the sheet free of the bonding material, moving first and second pluralities of spaced apart portions of said flexible material relative to one another in a direction generally normal to said surface to form indentations each greater than one-half of the total thickness of the manufactured pad and moving tensioning stretching and drawing the portions therebetween into walls between said first and second pluralities of portions disposed at an angle to the surface of said flexible material to form a manufactured pad which is substantially thicker than said fibrous sheet material while said bonding material is in a fluid condition, and transforming said bonding material into a solid form to resiliently fix said indentations in shape.

2. The method as claimed in claim 1 wherein the adherent bonding material comprises a mixture of a liquid and a solid.

3. The method as claimed in claim 1 wherein the adherent bonding material comprises a liquid.

4. The method as claimed in claim 1 wherein the adherent bonding material comprises a solid plastic thermally flowable material, and wherein heat is applied during the drawing operation to at least partially liquify the thermally flowable material.

5. The method of increasing the ductility of an absorbent fibrous sheet material incident to distorting its shape beyond the rupture point of the dry absorbent material and of flexibly fixing the material in the distorted shape which comprises the steps of applying to at least one surface of said absorbent material a substance which will wet said material while the shape of said material is being distorted and which will form a flexible adherent coating on portions of said material upon subsequent curing while maintaining a portion of the fibrous sheet material at the interior of the sheet free of the substance, distorting the shape of said material by tensioning and stretching portions thoereof beyond the rupture point of the dry material but less than the rupture point of the wetted material by forming indentations therein each greater than one-half of the total thickness of the manufactured article to form a manufactured article which is thicker than said fibrous sheet material, and curing said substance to resiliently fix said indentations in shape.

6. The method of claim 5 in which said substance is a mixture of a liquid and a solid and in which the curing is accomplished by drying.

7. The method of claim 5 in which said substance is a thermally flowable solid, in which heat is applied during the distorting operating to cause said thermally flowable solid to wet said absorbent material, and in which the curing is accomplished by cooling.

References Cited in the file of this patent

UNITED STATES PATENTS

| | | |
|---|---|---|
| 728,829 | Arkell | May 26, 1903 |
| 864,775 | Ferres | Sept. 3, 1907 |
| 1,016,093 | Reinstein | Jan. 30, 1912 |

(Other references on following page)

UNITED STATES PATENTS

| | | | |
|---|---|---|---|
| 1,954,635 | Leonard | Apr. 10, | 1934 |
| 1,965,265 | Spohn | July 3, | 1934 |
| 1,971,780 | Graham et al. | Aug. 28, | 1934 |
| 1,995,057 | Ellis | Mar. 19, | 1935 |
| 2,045,384 | Gerb | June 23, | 1936 |
| 2,173,797 | Toohey et al. | Sept. 19, | 1939 |
| 2,173,815 | Slisz et al. | Sept. 19, | 1939 |
| 2,314,162 | Reinhardt | Mar. 16, | 1943 |
| 2,464,301 | Francis | Mar. 15, | 1949 |
| 2,652,878 | Gerard | Sept. 22, | 1953 |
| 2,704,106 | Doyle et al. | Mar. 15, | 1955 |
| 2,774,698 | Jenk et al. | Dec. 18, | 1956 |
| 2,803,577 | Colt et al. | Aug. 20, | 1957 |
| 2,834,809 | Schutte et al. | May 13, | 1958 |

FOREIGN PATENTS

| | | | |
|---|---|---|---|
| 187,005 | Germany | July 11, | 1907 |